US012609448B2

(12) United States Patent
Li et al.

(10) Patent No.: US 12,609,448 B2
(45) Date of Patent: Apr. 21, 2026

(54) COLLOCATED MMWAVE AND SUB-6 GHZ ANTENNAS

(71) Applicant: Google LLC, Mountain View, CA (US)

(72) Inventors: Pei Li, Milpitas, CA (US); Chun Kit Lai, Sunnyvale, CA (US); Vijay L. Asrani, San Jose, CA (US)

(73) Assignee: Google LLC, Mountain View, CA (US)

( * ) Notice: Subject to any disclaimer, the term of this patent is extended or adjusted under 35 U.S.C. 154(b) by 336 days.

(21) Appl. No.: 18/247,601

(22) PCT Filed: Aug. 31, 2021

(86) PCT No.: PCT/US2021/048452

§ 371 (c)(1),
(2) Date: Mar. 31, 2023

(87) PCT Pub. No.: WO2022/072105

PCT Pub. Date: Apr. 7, 2022

(65) Prior Publication Data

US 2023/0378646 A1 Nov. 23, 2023

Related U.S. Application Data

(60) Provisional application No. 63/086,480, filed on Oct. 1, 2020.

(51) Int. Cl.
*H01Q 5/307* (2015.01)
*H01Q 1/24* (2006.01)
(Continued)

(52) U.S. Cl.
CPC ............. *H01Q 5/307* (2015.01); *H01Q 1/243* (2013.01); *H01Q 5/40* (2015.01); *H01Q 21/28* (2013.01)

(58) Field of Classification Search
CPC .......... H01Q 5/307; H01Q 1/243; H01Q 5/40; H01Q 21/28; H01Q 5/392
See application file for complete search history.

(56) References Cited

U.S. PATENT DOCUMENTS 5,917,455 A * 6/1999 Huynh .................. H01Q 11/10
333/161
9,972,892 B2 * 5/2018 Noori ..................... H01Q 19/10
(Continued)

FOREIGN PATENT DOCUMENTS

CN 107567667 A 1/2018
EP 3091608 11/2016
(Continued)

OTHER PUBLICATIONS

"International Preliminary Report on Patentability", Application No. PCT/US2021/048452, Mar. 28, 2023, 10 pages.
(Continued)

*Primary Examiner* — Dameon E Levi
*Assistant Examiner* — Jordan E. DeWitt
(74) *Attorney, Agent, or Firm* — Colby Nipper PLLC

(57) ABSTRACT

Techniques and apparatuses are described that implement collocated mm Wave and sub-6 GHz antennas. An apparatus includes at least one mmWave antenna that produces a near-field radiation region and a far-field radiation pattern in a mmWave frequency band. Disposed within the near-field radiation region is a sub-6 GHz antenna that produces a radiation pattern in a sub-6 GHz frequency band. The sub 6 GHz antenna is able to positively affect the far-field radiation pattern from the mm Wave antenna (e.g., via steering and/or broadening). In this way, the mmWave antenna and the sub-6 GHz antenna can be collocated to conserve space while also steering and/or broadening the far-field radiation pattern of the mm Wave antenna.

20 Claims, 7 Drawing Sheets

(51) Int. Cl.
*H01Q 5/40* (2015.01)
*H01Q 21/28* (2006.01)

(56) References Cited

U.S. PATENT DOCUMENTS 10,103,424 B2* 10/2018 Noori ........ H01Q 1/243
10,965,030 B2* 3/2021 Han ........ H01Q 1/243
11,011,827 B2* 5/2021 Thai ........ H01Q 1/243
2004/0113847 A1* 6/2004 Qi ........ H01Q 9/26 343/702
2004/0157644 A1* 8/2004 Aytur ........ H01Q 1/525 455/562.1
2004/0178943 A1* 9/2004 Niv ........ G01S 13/935 342/191
2005/0017917 A1* 1/2005 Park ........ G01S 3/46 343/824
2005/0068249 A1* 3/2005 Frederick du Toit .. H01Q 3/242 343/757
2006/0038734 A1* 2/2006 Shtrom ........ H01Q 21/062 343/700 MS
2007/0210974 A1* 9/2007 Chiang ........ H01Q 19/32 343/757
2007/0257856 A1* 11/2007 Peterson ........ H01Q 15/0026 343/872
2010/0007573 A1* 1/2010 Kuramoto ........ H01Q 25/005 343/893
2014/0375502 A1* 12/2014 Foo ........ H01Q 15/14 343/893
2015/0109178 A1* 4/2015 Hyde ........ H01Q 13/28 343/772
2016/0308563 A1* 10/2016 Ouyang ........ H01Q 25/005
2017/0054214 A1* 2/2017 Sanders ........ H01Q 9/0442
2018/0045815 A1* 2/2018 Lilja ........ G01S 7/415
2018/0069326 A1* 3/2018 Van Gils ........ H01Q 21/28
2018/0083357 A1* 3/2018 Nicolls ........ H01Q 3/2658
2018/0123236 A1* 5/2018 Van Gils ........ H01Q 9/0414
2018/0175515 A1* 6/2018 Boutayeb ........ H01Q 21/30
2018/0269579 A1* 9/2018 Bartone ........ H01Q 9/045
2018/0309186 A1* 10/2018 Yu ........ H01Q 21/22
2019/0020110 A1* 1/2019 Paulotto ........ H01Q 5/392
2019/0020121 A1* 1/2019 Paulotto ........ H01Q 21/28
2019/0061942 A1* 2/2019 Miller ........ G08G 5/55
2019/0260127 A1* 8/2019 Shi ........ H01Q 9/42
2020/0021019 A1* 1/2020 Rajagopalan ........ H01Q 1/2291
2020/0091608 A1 3/2020 Alpman et al.
2020/0106158 A1* 4/2020 Gomez Angulo .... G06F 1/1698
2020/0106182 A1* 4/2020 Ravishankar ........ H01Q 1/523
2020/0133398 A1* 4/2020 Williams ........ G06F 3/017
2020/0176889 A1* 6/2020 Rojanski ........ H01Q 21/067
2020/0343632 A1* 10/2020 Capet ........ H01Q 25/04
2020/0358182 A1* 11/2020 Klemmer ........ H01Q 3/26
2020/0411957 A1* 12/2020 Zhu ........ H04B 7/04
2021/0104582 A1* 4/2021 Kim ........ H04M 1/0268
2021/0119346 A1* 4/2021 Sur ........ H01Q 1/243
2021/0249783 A1* 8/2021 Van Wonterghem .. H01Q 21/28
2021/0336337 A1* 10/2021 Obeidat ........ H01Q 19/30
2022/0029298 A1* 1/2022 Huang ........ H01Q 5/35
2022/0094061 A1* 3/2022 Yong ........ H01Q 5/385
2023/0099552 A1* 3/2023 Kim ........ H01Q 1/48 375/267
2023/0378643 A1* 11/2023 Li ........ H01Q 1/243
2023/0378646 A1* 11/2023 Li ........ H01Q 1/243
2023/0378652 A1* 11/2023 Jiang ........ H01Q 21/065
2024/0079776 A1* 3/2024 Scarborough ........ H01Q 21/061
2024/0250646 A1* 7/2024 Ahmad ........ H03F 3/45475
2024/0291143 A1* 8/2024 Dankberg ........ H04B 7/18519

FOREIGN PATENT DOCUMENTS

WO 2020119010 6/2020
WO 2022072105 4/2022
WO WO-2022072112 A1 * 4/2022 ........ H01Q 3/44

OTHER PUBLICATIONS

"International Search Report and Written Opinion", PCT Application No. PCT/US2021/048452, Dec. 6, 2021, 13 pages.
"Foreign Office Action", IN Application No. 202347007821, Nov. 22, 2023, 6 pages.
Naqvi, et al., "Integrated LTE and Millimeter-Wave G Mimo Antenna System for 4G/5G Wireless Terminals", Jul. 2020, 20 pages.
"Foreign Office Action", CN Application No. 202180055562.4, Jan. 26, 2026, 17 pages.

* cited by examiner

COLLOCATED MMWAVE AND SUB-6 GHZ ANTENNAS

RELATED APPLICATION(S)

This application is a national stage entry of International Application No. PCT/US2021/048452, filed Aug. 31, 2021, which claims the benefit of U.S. Provisional Application No. 63/086,480, filed Oct. 1, 2020, the disclosures of which are incorporated herein by reference in their entirety.

BACKGROUND

Computing devices use radio-frequency (RF) signals to communicate information. These RF signals enable users to talk with friends, download or upload information, share pictures, remotely control household devices, as well as to interact with a computing device using non-contact gestures. Some computing devices can provide a variety of different features and functionality by transmitting and receiving radio-frequency signals of different frequency bands. For example, an example computing device utilizes millimeter wave (mmWave) RF signals (e.g., signals with frequencies greater than or equal to 24 gigahertz (GHz)) to support 5th-Generation cellular communications, WiGig™ communications, or non-contact radar gesture recognition. Additionally, the computing device utilizes sub-6 GHz RF signals to provide Bluetooth™ communications, Wi-Fi™ communications, and other low-frequency radar applications, such as human vital-sign detection.

To support these various frequency bands, the computing device can include multiple antennas (or multiple antenna arrays), each of which are designed (or tuned) to a specific frequency band. In some cases, multiple antennas associated with a same frequency band are placed on different sides of the computing device to steer or increase an angular range of a radiation pattern. Due to space constraints within the computing device, however, finding locations for the multiple antennas can be a challenge. Consequently, the computing device may be limited in the radiation patterns it can realize while still realizing an optimal form factor.

SUMMARY

Techniques and apparatuses are described that implement collocated mmWave and sub-6 GHz antennas. An apparatus includes at least one mmWave antenna that produces a near-field and a far-field radiation pattern in a mmWave frequency band. Disposed within the near-field radiation region is a sub-6 GHz antenna that produces a radiation pattern in a sub-6 GHz frequency band. The placement of the sub-6 GHz antenna within the near-field radiation region of the mmWave antenna causes these antennas to be coupled together in a way that augments the far-field radiation pattern of the mmWave frequency band in a desired manner. In particular, the sub-6 GHz antenna is able to reflect energy associated with the far-field radiation pattern or produce another far-field radiation pattern in the mmWave frequency band based on currents induced in the sub-6 GHz antenna by the near-field radiation region of the mmWave antenna. The reflected energy and/or the other far-field radiation pattern positively affects the far-field radiation pattern from the mmWave antenna. For example, in the case of the other far-field radiation pattern, the other far-field radiation pattern combines with the far-field radiation pattern from the mmWave antenna to produce a combined far-field radiation pattern that differs from the far-field radiation pattern from the mmWave antenna in a desired way (e.g., it is steered and/or broadened). In this way, the mmWave antenna and the sub-6 GHz antenna can be collocated while also steering and/or broadening the mmWave far-field radiation pattern compared to the far-field radiation pattern generated by the mmWave antenna in the absence of the sub-6 GHz antenna. This collocation provides additional space within the apparatus for other antennas or components and allows the mmWave antenna to provide broader coverage without necessitating another mmWave antenna.

Aspects described below include an apparatus comprising a housing, at least one mmWave antenna configured to generate a near-field radiation region in a mmWave frequency band, and at least one sub-6 GHz antenna. The sub-6 GHz antenna is configured to generate a radiation pattern in a sub-6 gigahertz frequency band, is disposed between the mmWave antenna and the housing, and is disposed within the near-field radiation region of the mmWave antenna.

Aspects described below also include a method implemented by a computing device. The method comprises transmitting a mmWave signal using at least one mmWave antenna. The transmission of the mmWave signal forms a near-field radiation region and a far-field radiation pattern in a mmWave frequency band. A current is induced in at least one sub-6 GHz antenna by the near-field radiation region. Based on the induced current from the near-field radiation region, another far-field radiation pattern in the mmWave frequency band is radiated by the sub-6 GHz antenna that is constructive to the far-field radiation pattern radiated by the mmWave antenna.

BRIEF DESCRIPTION OF THE DRAWINGS

Apparatuses for and techniques implementing collocated mmWave and sub-6 GHz antennas are described with reference to the following drawings. The same numbers are used throughout the drawings to reference like features and components.

DETAILED DESCRIPTION

Overview

Figure 1:
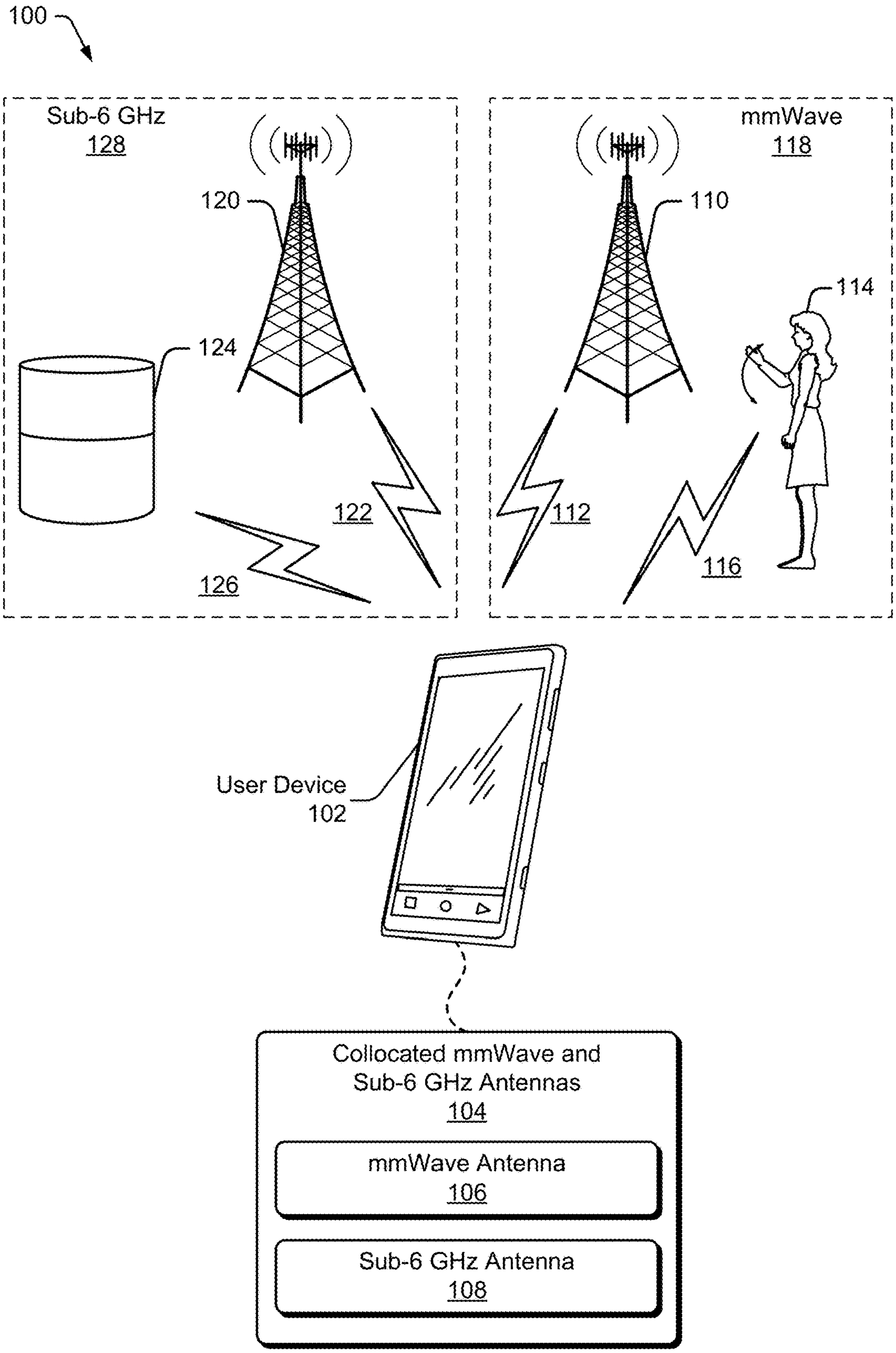
FIG. 1 illustrates an example environment in which collocated mmWave and sub-6 GHz antennas can be implemented.

To support multiple frequency bands, a computing device can include multiple antennas (or multiple antenna arrays), each of which are designed (or tuned) to a specific frequency band. In some cases, multiple antennas associated with a same frequency band are placed on different sides of the computing device to optimize radiation patterns for that particular frequency band. Finding optimal locations for multiple antennas within computing devices can be challenging.

To fit the multiple antennas within an available space, some antennas may be positioned within close proximity of each other. This close proximity, however, can introduce undesired coupling between the different antennas. Left unchecked, this undesired coupling can increase noise levels within the computing device and make it challenging to detect desired radio-frequency signals. Therefore, some computing devices place these antennas as far away from each other as possible to avoid undesired coupling (e.g., interference) between the respective antennas. Consequently, these computing devices may be limited on the quantity of frequency bands it can support and/or the angular extent amount of signal coverage that can be realized for each frequency band.

To address this issue, techniques and apparatuses are described that implement collocated mmWave and sub-6 GHz antennas. By placing a sub-6 GHz antenna in a near-field radiation region of a mmWave antenna, not only can the antennas be collocated, but the sub-6 GHz antenna can also steer and/or broaden a far-field radiation pattern of the mmWave antenna. The placement of the sub-6 GHz antenna within the near-field radiation region of the mmWave antenna causes these antennas to be coupled together in a way that augments the far-field radiation pattern of the mmWave frequency band in a desired manner. In particular, the sub-6 GHz antenna reflects energy associated with the far-field radiation pattern of the mmWave antenna or produces another far-field radiation pattern in a mmWave frequency band based on currents induced by the near-field radiation region of the mmWave antenna in such a way that the resultant combined mmWave far-field radiation pattern is affected in a desired way (e.g., steered and/or broadened), compared to the far-field radiation pattern provided by the mmWave antenna in the absence of the sub-6 GHz antenna. For example, the combined far-field radiation pattern may cover a broader range of angles than the far-field radiation pattern of the mmWave antenna and/or may have a direction of maximum energy that is different than that of the pattern of the mmWave antenna far-field radiation pattern. The described techniques and apparatuses achieve optimized packaging (via collocation) with a minimal effect on a radiation pattern of the sub-6 GHz antenna (e.g., mmWave radiation causes minimal interference to the sub-6 GHz radiation) while also steering and broadening the far-field radiation pattern of the mmWave antenna. In this way, the far-field radiation pattern can be effectively steered and/or broadened while also integrating the sub-6 GHz antenna with a simple cost and space-effective design. The collocation provides additional space within the computing device for other antennas or components and allows the mmWave antenna to provide broader coverage without necessitating another mmWave antenna.

Example Environment

FIG. 1 is an illustration of an example environment 100 in which techniques using, and an apparatus including, collocated mmWave and sub-6 GHz antennas can be embodied. In the environment 100, a user device 102 includes collocated mmWave and sub-6 GHz antennas 104 comprising at least one mmWave antenna 106 and at least one sub-6 GHz antenna 108 that will be discussed in regard to FIG. 2.

In the environment 100, the user device 102 is a user equipment (UE) that uses the collocated mmWave and sub-6 GHz antennas 104. Using the mmWave antenna 106, the user device 102 communicates with a base station 110 via a mmWave wireless link 112. Additionally or alternatively, the user device 102 uses the mmWave antenna 106 to detect gestures made by a user 114 via mmWave transmission/reflection signals 116. The mmWave wireless link 112 and the mmWave transmission/reflection signals 116 are collectively shown as mmWave 118. Using the sub-6 GHz antenna 108, the user device 102 communicates with a base station 120 via a sub-6 GHz wireless link 122 or communicates with an access point 124 via a sub-6 GHz wireless link 126 (collectively shown as sub-6 GHz 128).

Any suitable communication protocols or standards can be used to implement the mmWave wireless link 112 and the sub-6 GHz links 120 and 124. For example, the mmWave wireless link 112 can represent a 5th-Generation New Radio (5G NR) link. The sub-6 GHz wireless link 120 can represent a 4th-Generation Long-Term Evolution (4G LTE) link. The sub-6 GHz wireless link 124 can represent a Wi-Fi™ link or a personal area network (e.g., Bluetooth™) link. The mmWave transmission/reflection signals 116 can represent radio detection and ranging (RADAR) signals. Using the radar signals 116, the user device 102 can support a variety of radar-based applications, including presence detection (e.g., detecting the presence of the user 114 near the user device 102), gesture recognition, collision avoidance, and human vital-sign detection. Although not shown, some implementations of the user device 102 can utilize the sub-6 GHz antenna 108 for radar-based applications. The user device 102 is further described with respect to FIG. 2.

Example Device

Figure 2:
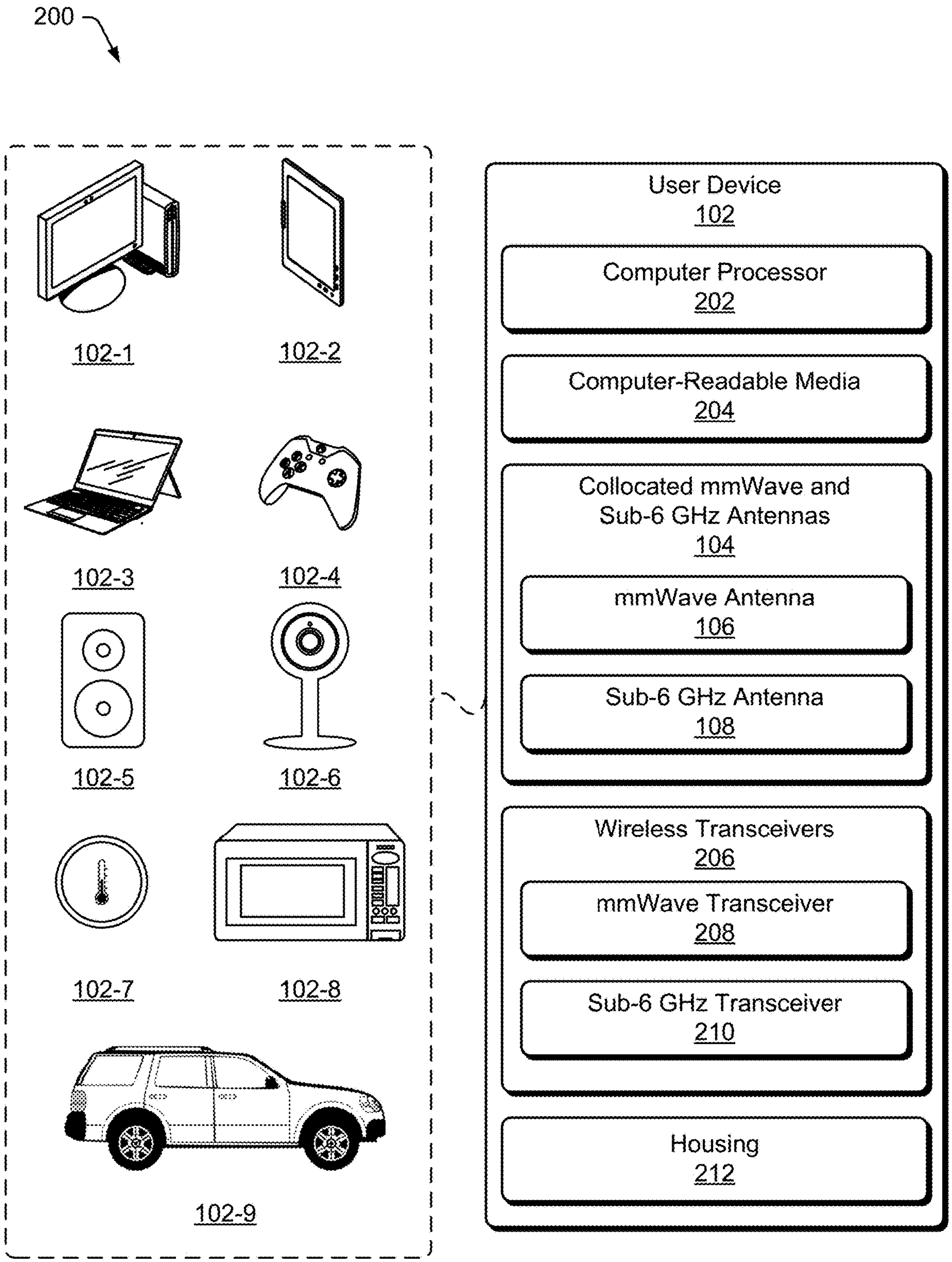
FIG. 2 illustrates an example user device in which collocated mmWave and sub-6 GHz antennas can be implemented.

FIG. 2 illustrates, at 200, the collocated mmWave and sub-6 GHz antennas 104 as part of the user device 102. The user device 102 can be any suitable computing device or electronic device, such as a desktop computer 102-1, a tablet 102-2, a laptop 102-3, a gaming system 102-4, a smart speaker 102-5, a security camera 102-6, a smart thermostat 102-7, a microwave 102-8, or a vehicle 102-9. Other devices can also be used, such as home-service devices, radar systems, baby monitors, routers, computing watches, computing glasses, televisions, drones, charging devices, Internet of Things (IoT) devices, Advanced Driver Assistance Systems (ADAS), point-of-sale (POS) transaction systems, health monitoring devices, track pads, drawing pads, netbooks, e-readers, home-automation and control systems, and other home appliances. The user device 102 can be wearable, non-wearable but mobile, or relatively immobile (e.g., desktops and appliances).

The user device 102 includes at least one computer processor 202 and computer-readable media 204, which includes memory media and storage media. Applications and/or an operating system (not shown) embodied as computer-readable instructions on the computer-readable media 204 can be executed by the computer processor 202. The computer-readable instructions can store instructions to enable wireless communications with the base station 110, base station 120, or access point 124 or radar sensing (e.g., gesture recognition, presence detection, collision avoidance, or human vital-sign detection), as described with respect to FIG. 1. The user device 102 can also include a display (not shown).

The user device 102 includes the mmWave antenna 106 and the sub-6 GHz antenna 108 along with wireless transceivers 206. The mmWave antenna 106 and the sub-6 GHz antenna 108 can include one or more bowtie antennas, patch antennas, dipole antennas, inverted-F antennas, or some combination thereof. Connected to the mmWave antenna 106 is at least one mmWave transceiver 208, for example a 5th-Generation (5G) transceiver, that is configured to transmit and receive mmWave radio-frequency signals via the mmWave antenna 106. The mmWave transceiver 208 includes circuitry and logic for generating and processing the mmWave radio-frequency signals. Components of the mmWave transceiver 208 can include amplifiers, mixers, switches, analog-to-digital converters, filters, and so forth for conditioning the radio-frequency signals. The mmWave transceiver 208 also includes logic to perform in-phase/quadrature (I/Q) operations, such as modulation or demodulation.

Together, the mmWave transceiver 208 and the mmWave antenna 106 can transmit or receive RF signals (e.g., mmWave wireless link 112 and/or mmWave transmission/reflection signals 116) with frequencies at or above 24 gigahertz (GHz). In general, the frequency bands associated with these frequencies are referred to as millimeter-wave (mmWave) frequency bands. These mmWave frequency bands can defined by one or more supported communication standards and/or radar sensing operations. In some implementations, the transmission/reflection signals 116 can comprise RF signals with frequencies of approximately 60 GHz. The mmWave antenna 106 can comprise an antenna array (e.g., a one or two-dimensional array of antennas). However implemented, the mmWave antenna 106 generates near-field and far-field radiation patterns of mmWave signals.

Connected to the sub-6 GHz antenna 108 is at least one sub-6 GHz transceiver 210, for example a 4th-Generation (4G) transceiver, a Bluetooth transceiver, or a Wi-Fi™ transceiver, that is configured to transmit and receive sub-6 GHz radio-frequency signals via the sub-6 GHz antenna 108. The sub-6 GHz transceiver 210 includes circuitry and logic for generating and processing the sub-6 GHz radio-frequency signals. Components of the sub-6 GHz transceiver 210 can include amplifiers, mixers, switches, analog-to-digital converters, filters, and so forth for conditioning the radio-frequency signals. The sub-6 GHz transceiver 210 also includes logic to perform in-phase/quadrature (I/Q) operations, such as modulation or demodulation.

Together, the sub-6 GHz transceiver 210 and the sub-6 GHz antenna 108 can transmit or receive RF signals (e.g., sub-6 GHz wireless link 122 and/or sub-6 GHz wireless link 126) with frequencies at or below 6 gigahertz (sub-6 GHz). The frequency bands associated with these frequencies are referred to as sub-6 GHz frequency bands. These sub-6 GHz frequency bands can be defined by one or more supported communication standards and/or radar sensing operations. The sub-6 GHz antenna 108 can comprise an antenna array (e.g., a one or two-dimensional array of antennas). However implemented, the sub-6 GHz antenna 108 generates radiation patterns of sub-6 GHz signals.

The sub-6 GHz antenna 108 is disposed within a near-field radiation region of the mmWave antenna 106 and between the mmWave antenna 106 and a housing 212 of the user device 102. The housing 212 (or a portion of which that is covering an area of the mmWave antenna 106 and the sub-6 GHz antenna 108) is preferably made of an RF translucent or RF transparent material. In other words, the housing 212 generally does not significantly affect the radiation patterns of the mmWave antenna 106 and the sub-6 GHz antenna 108 (e.g., minimally attenuates the radiation patterns). In some implementations, the sub-6 GHz antenna 108 can be an integral part of the housing 212 (e.g., represents a portion of the housing). For example, a metal piece or structure of the housing 212 may be used as the sub-6 GHz antenna 108. In other implementations, the mmWave antenna 106 and the sub-6 GHz antenna 108 can be packaged together as part of an antenna module.

The sub-6 GHz antenna 108 reflects a portion of the near-field radiation of the mmWave antenna 106 to affect the overall mmWave far-field radiation pattern compared to the far-field radiation pattern of the mmWave antenna 106 in the absence of the sub-6 GHz antenna. In addition or alternatively, the near-field radiation region of the mmWave antenna 106 can cause a current to be induced in the sub-6 GHz antenna 108. This current causes the sub-6 GHz antenna 108 to generate another far-field radiation pattern in the mmWave frequency band that combines with the far-field radiation pattern of the mmWave antenna 106 to produce a combined mmWave far-field radiation pattern. By either or both mechanisms, the sub-6 GHz antenna 106 steers and/or broadens the far-field radiation pattern of the mmWave antenna 106 (e.g., produces a combined mmWave far-field radiation pattern that is steered and/or broadened compared to the far-field radiation pattern of the of the mmWave antenna 106 alone) while minimally affecting the radiation pattern of the sub-6 GHz antenna in the sub-6 GHz band. The techniques and apparatuses described herein, however, can be applied to different frequency bands without departing from the scope of this disclosure (e.g., as long as the bands are separated from each other). The near and far-field radiation patterns of the mmWave antenna 106 are further described with respect to FIG. 3.

Near and Far-Field Radiation Patterns

Figure 3:
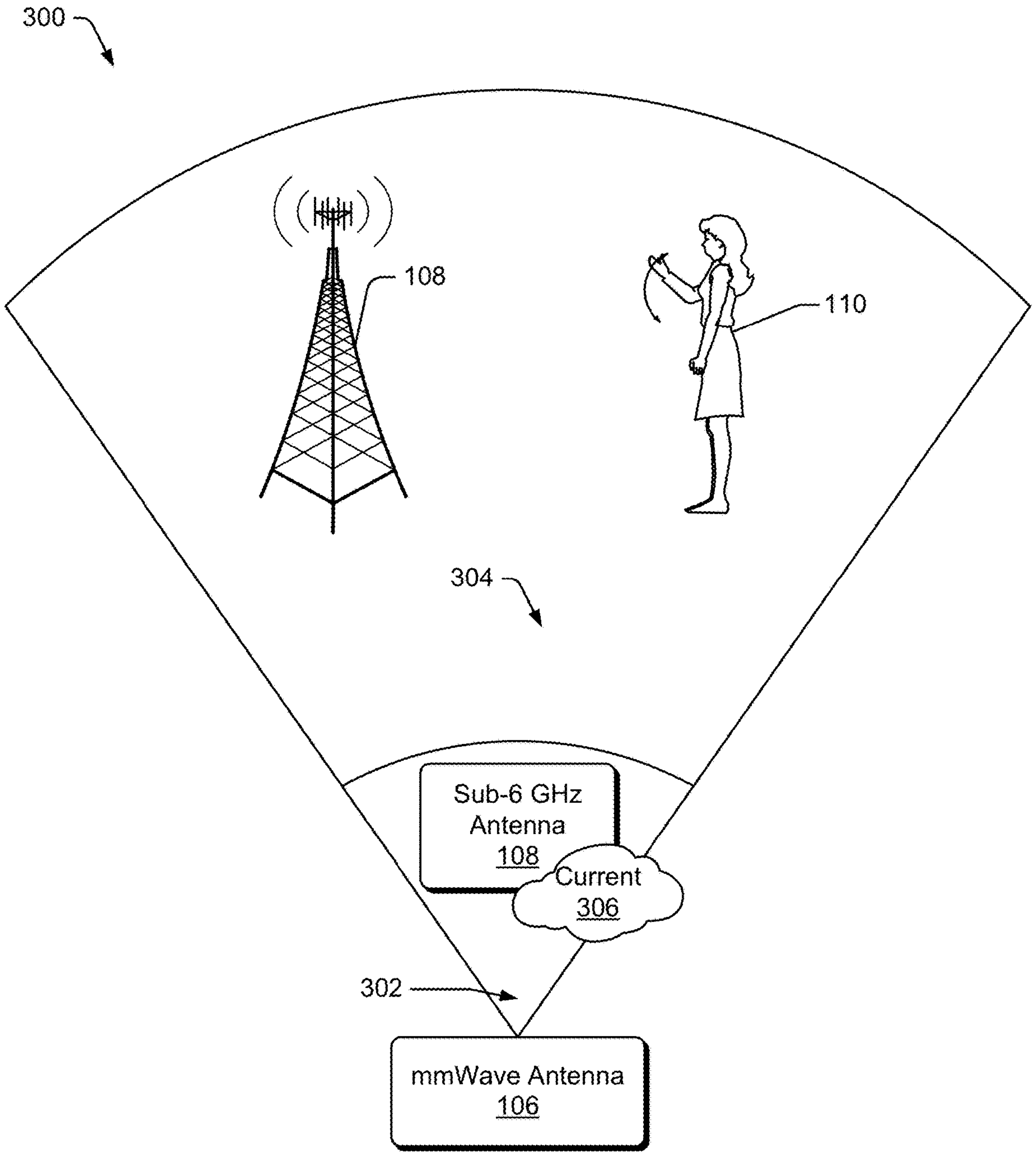
FIG. 3 illustrates example near-field and far-field radiation patterns of a mmWave antenna.

FIG. 3 illustrates, at 300, a near-field radiation region 302 and a far-field radiation pattern 304 of the mmWave antenna 106. A boundary between the near-field radiation region 302 and the far-field radiation pattern 304 is generally characterized by the Fraunhofer distance, which is dependent upon the frequencies transmitted by the mmWave antenna 106. In some example implementations, this boundary can be a few millimeters from the mmWave antenna 106 or less. For the purposes of this disclosure, the near-field radiation region 302 is generally within the user device 102, although it may extend past the housing 212 of the user device 102. The far-field radiation pattern 304 has an effective range that enables the user device 102 to wirelessly communicate with the base station 110 and/or recognize gestures performed by the user 114 through radar sensing, as shown in FIG. 1. In FIG. 3, the near-field radiation region 302 and the far-field radiation pattern 304 are not drawn to scale for illustration simplicity and description purposes.

As shown in FIG. 3, the sub-6 GHz antenna 108 is positioned within the near-field radiation region 302 of the mmWave antenna 106. Due to this position, the sub-6 GHz antenna 108 interacts with the electric and magnetic fields within the near-field radiation region 302. This interaction causes the sub-6 GHz antenna 108 to reflect a portion of the near-field mmWave radiation, which can affect (e.g., influence or change) the far-field radiation pattern 304 of the mmWave antenna 106. In other words, the coupling between the mmWave antenna 106 and the sub-6 GHz antenna 108 due to the location of the sub-6 GHz antenna 108 in the near-field radiation region 302 of the mmWave antenna 106 causes a current 306 to be induced in sub-6 GHz antenna 108 (other than that induced from the sub-6 GHz transceiver 210 or from received sub-6 GHz RF signals). The current 306 causes the sub-6 GHz antenna 108 to radiate another far-field radiation pattern in the mmWave frequency band that is constructive to (e.g., interferes constructively with) the far-field radiation pattern 304 of the mmWave antenna 106 to produce a combined mmWave far-field radiation pattern.

By placing the sub-6 GHz antenna 108 within the near-field radiation region 302 of the mmWave antenna 106, the sub-6 GHz antenna 108 is able to improve signal coverage of the mmWave antenna 106 (e.g., by steering and/or broadening the mmWave far-field radiation pattern 304) while also being located near the mmWave antenna 106 and so as to not occupy a different area of the user device 102. An example implementation of the collocated mmWave and sub-6 GHz antennas 104 is further described with respect to FIG. 4.

User Device Configuration

Figure 4:
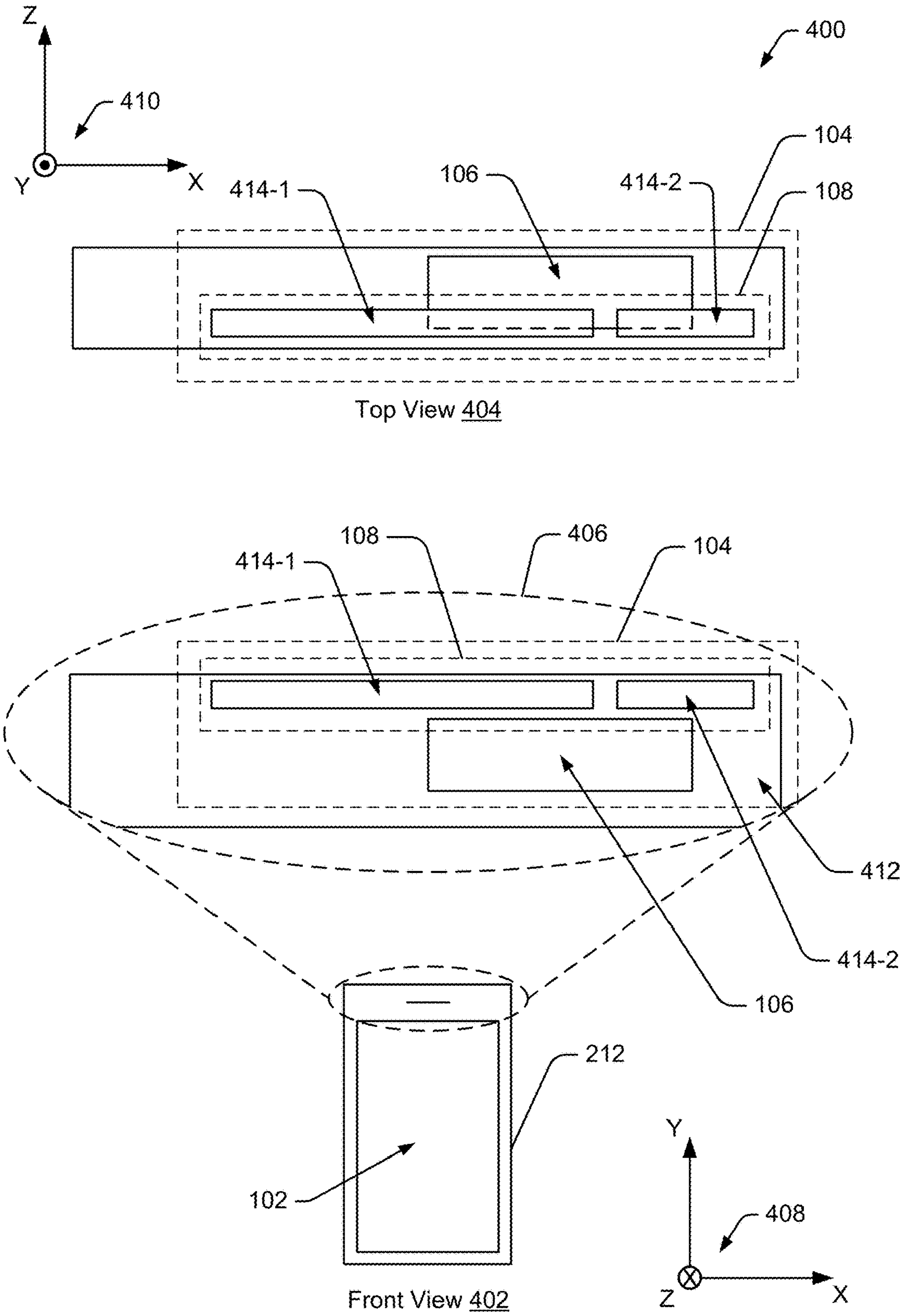
FIG. 4 illustrates an example implementation of collocated mmWave and sub-6 GHz antennas.

FIG. 4 shows an example implementation of the collocated mmWave and sub-6 GHz antennas 104. The illustrated implementation 400 contains a front view 402 and a top view 404 of the user device 102, along with a detail view 406 of a portion of the front view 402. The front view 402 illustrates the user device 102 along a Z axis that is normal (e.g., perpendicular) to an X-Y plane of a front view coordinate system 408. The top view 404 illustrates the user device 102 along the Y axis, which is normal to an X-Z plane of a top view coordinate system 410. The front view coordinate system 408 and the top view coordinate system 410 are rotations of a same global coordinate system. The X axis is generally a width axis, the Y axis is generally a height axis, and the Z axis is generally a thickness axis of the user device 102. The global coordinate system is arbitrary, however, and is merely provided to show/describe locations and configurations of the disclosed components.

The sub-6 GHz antenna 108 is disposed between the mmWave antenna 106 and the housing 212 of the user device 102. More specifically, the mmWave antenna 106 and the sub-6 GHz antenna 108 are disposed within a top bezel area 412 of the user device 102, as shown in the front view 402. Although the bounding boxes denoting the collocated mmWave and sub-6 GHz antennas 104 and the sub-6 GHz antenna 108 are shown as extending outside the user device 102, the bounding boxes are for illustration only. In this location, the mmWave antenna radiates energy across the X-Z plane. The mmWave antenna 106 has a direction of maximum far-field energy, without beamforming, in a positive direction along the Y axis. The sub-6 GHz antenna 108 is able to steer and/or broaden the far-field radiation pattern in a Y-Z plane, as described with respect to FIG. 5.

Although shown in the top bezel area 412, the mmWave antenna 106 and the sub-6 GHz antenna 108 can be disposed together in another area of the user device 102 (e.g., on a side or bottom area of the user device 102) with a different direction of maximum far-field energy and possibly a different steering/broadening plane. Similarly, multiple instances of the mmWave antenna 106 and the sub-6 GHz antenna 108 can be placed in respective areas of the user device 102 to improve mmWave antenna coverage in other directions and planes.

In an example implementation, the sub-6 GHz antenna 108 is formed using one or more metal pieces (e.g., 414-1 and 414-2). The metal pieces can be tuned (individually or collectively) to have a certain frequency, electric loading, resistance, reflectivity, or impedance. The tuning allows the metal pieces, when radiated upon by the near-field radiation of the mmWave antenna 106, to positively affect the far-field radiation pattern 304 of the mmWave antenna 106.

Although shown as bar-like structures, the metal pieces can be curved, have bends on the ends in the X-Z plane or the X-Y plane, have various cross-sections, or have varying cross-sections along its length to achieve the tuning. Furthermore, the metal pieces can be made of various conducting materials. By configuring the electric characteristics, the shape, and the materials of the metal pieces, different effects on the mmWave far-field radiation pattern can be achieved. For example, a peak amplitude, directivity, and/or shape of the mmWave far-field radiation pattern 304 may be affected. The effects on the mmWave far-field radiation pattern 304 can be weighed against negative effects, if any, on a radiation pattern of the sub-6 GHz antenna in the sub-6 GHz band.

In some implementations, at least a portion of the sub-6 GHz antenna 108 overlaps at least a portion of the mmWave antenna 106 when viewed along the Y axis (e.g., in the top view 404). For example, the sub-6 GHz antenna 108 can overlap the mmWave antenna 106 by less than 0.25 mm along the Z axis. The sub-6 GHz antenna 108 can be any width (e.g., length along the X axis) and/or comprise any number of metal pieces. The metal pieces can be similar sizes or shapes or can be different based on configuration. Different locations of the sub-6 GHz antenna 108 along the Z axis can enable an amount and/or direction of the steering/broadening effect on the far-field radiation pattern 304 to be configured.

Figure 5:
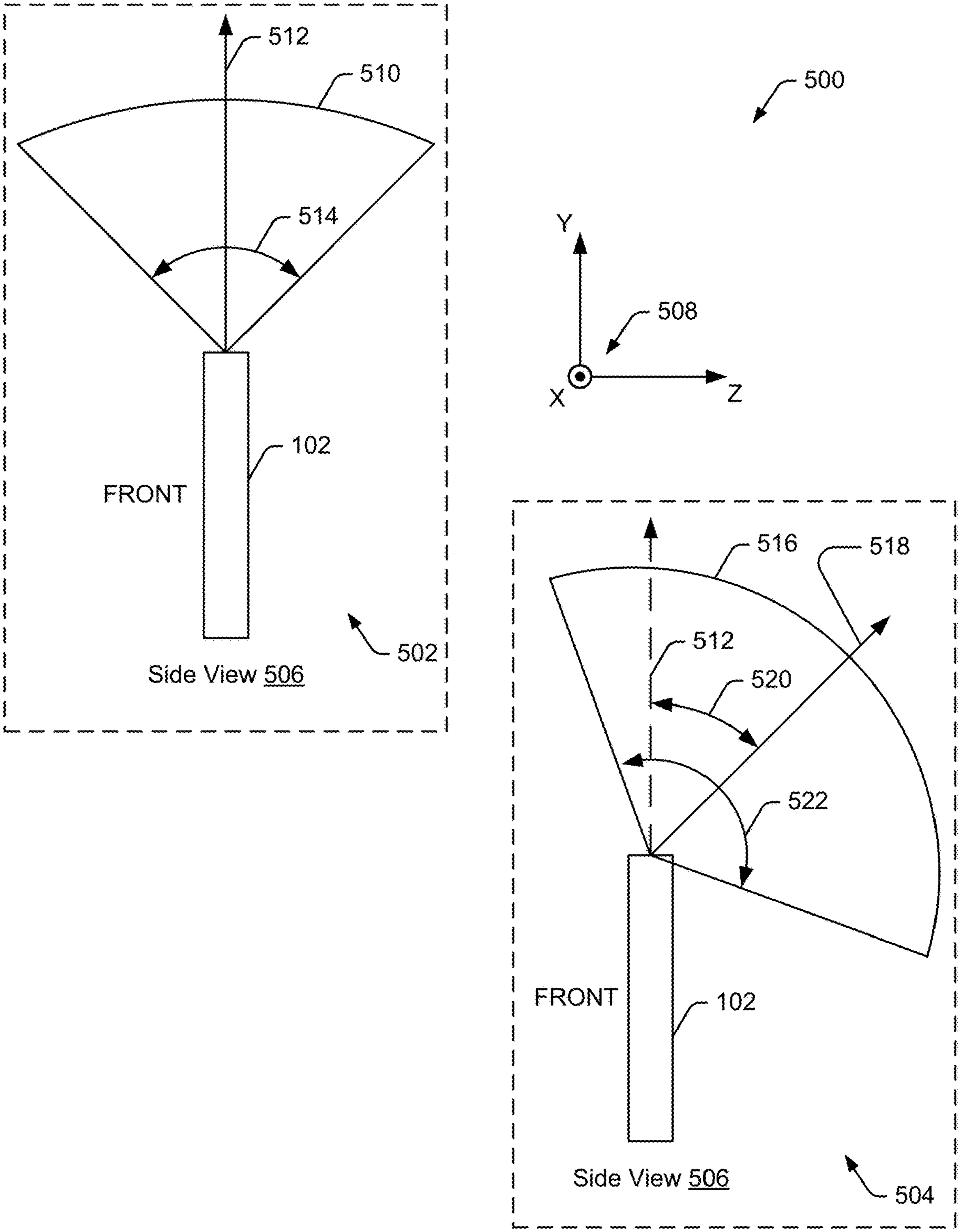
FIG. 5 illustrates an example effect of collocated mmWave and sub-6 GHz antennas.

For example, in the illustrated implementation 400, the sub-6 GHz antenna 108 steers the far-field radiation pattern 304 in a positive direction about the X axis (e.g., towards the back of the device as shown in FIG. 5). If the sub-6 GHz antenna 108 were placed toward the back edge of the device in the top view 404 (e.g., shifted in a positive Z direction to be opposite the mmWave antenna 106), then the sub-6 GHz antenna 108 could steer the far-field radiation pattern 304 in a negative direction about the X axis (e.g., towards the front of the device).

The metal pieces are generally separated from the mmWave antenna 106 along the Y axis (so as not to become part of the mmWave antenna 106 via direct electrical conduction). In some example implementations, a distance (e.g., separation) between the mmWave antenna 106 and the sub-6 GHz antenna 108 along the Y axis can be less than a millimeter. Although the sub-6 GHz antenna 108 is shown as being separated from the mmWave antenna 106 along the Y axis, portions of the sub-6 GHz antenna 108 can overlap along the X and Y axes outside of an area of the mmWave antenna 106. For example, one or more of the metal pieces of the sub-6 GHz antenna 108 can have bends that surround the mmWave antenna 106.

In other implementations not shown, the sub-6 GHz antenna 108 can include one or more bowtie antennas, patch antennas, dipole antennas, inverted-F antennas, or some combination thereof. These antennas can achieve similar effects on the far-field radiation pattern as described above with respect to the metal pieces.

Example Steering and Broadening

FIG. 5 depicts an example illustration 500 of a steering and broadening effect on a far-field radiation pattern 304 of a mmWave antenna 106. The illustration 500 shows an illustration 502 of the mmWave far field radiation pattern without the collocated mmWave and sub-6 GHz antennas of FIGS. 1-4 disposed within the user device 102 and an illustration 504 of the combined mmWave far field radiation pattern with the collocated mmWave and sub-6 GHz antennas of FIGS. 1-4 disposed within the user device 102. The illustrations 502 and 504 both show the user device 102 as viewed along the X axis (e.g., side view 506) that is normal to a Z-Y plane of a side view coordinate system 508.

In the illustration 502, the mmWave antenna 106 is configured to, without beamforming (and without the sub-6

GHz antenna 108 collocated), radiate a far-field radiation pattern 510 with a direction of maximum energy 512 that is generally in a same direction as the positive Y axis. The far-field radiation pattern 510 also has an angular coverage 514 that corresponds to a range of angles of the far-field radiation pattern 510 that are above a threshold energy level.

In the illustration 504, the sub-6 GHz antenna 108 is collocated (e.g., the user device 102 is configured with the collocated mmWave and sub-6 GHz antennas 104), which causes a steering and/or broadening effect on the far-field radiation pattern 304. When implemented as part of the collocated mmWave and sub-6 GHz antennas 104, the sub-6 GHz antenna 108 causes the unimplemented far-field radiation pattern 510 (the original far-field radiation pattern) to shift to an implemented far-field radiation pattern 516. The implemented far-field radiation pattern 516 has an implemented direction of maximum energy 518 that has been shifted by a steering angle 520 from the unimplemented direction (original direction) of maximum energy 512. In this illustration, the steering angle 520 is positive (e.g., clockwise). If the sub-6 GHz antenna 108 is placed elsewhere (e.g., along the Z axis), greater or lesser steering angles or negative steering angles can be achieved.

The implemented far-field radiation pattern 516 also has an implemented angular coverage 522 that corresponds to a range of angles of the implemented far-field radiation pattern 516 that are above the threshold energy level. As illustrated, the implemented angular coverage 522 is broader compared to the unimplemented (original) angular coverage 514 (e.g., the angular range is greater). For example, the unimplemented angular coverage 514 may be 90 degrees (e.g., plus/minus forty-five degrees from the unimplemented direction of maximum energy 512 at zero degrees). The implemented angular coverage 522 may be 120 degrees (e.g., plus/minus sixty degrees from the implemented direction of maximum energy 518 of forty-five degrees), representing an increase of thirty degrees.

As discussed above, through configuration (including placement) of the sub-6 GHz antenna 108, various values of the steering angle 520 and broadening of the range of coverage (e.g., implemented angular coverage 522 vs. unimplemented angular coverage 514) can be achieved and balanced against any negative effects, if any, on a far-field radiation pattern from the sub-6 GHz antenna 108 in the sub-6 GHz frequency band. As also discussed above, the illustrated example of steering and broadening is in a single plane for a single antenna (or antenna array). By integrating similar other instances of the collocated mmWave and sub-6 GHz antennas 104 on other sides of the device, signal coverage of the device can be increased.

Through the collocation, the collocated mmWave and sub-6 GHz antennas 104 are able to produce the steering angle 520 and/or the implemented angular coverage 522 that are similar (or better) to those of implementations using multiple antennas (or antenna arrays) on different sides of the user device 102. In this way, the collocated mmWave and sub-6 GHz antennas 104 improve signal coverage of the mmWave antenna 106, reduce cost compared to multiple phased antennas, and, by locating the sub-6 GHz antenna in the near-field region of the mmWave antenna, also efficiently utilize available space to incorporate the sub-6 GHz antenna 108.

Example Method

Figure 6:
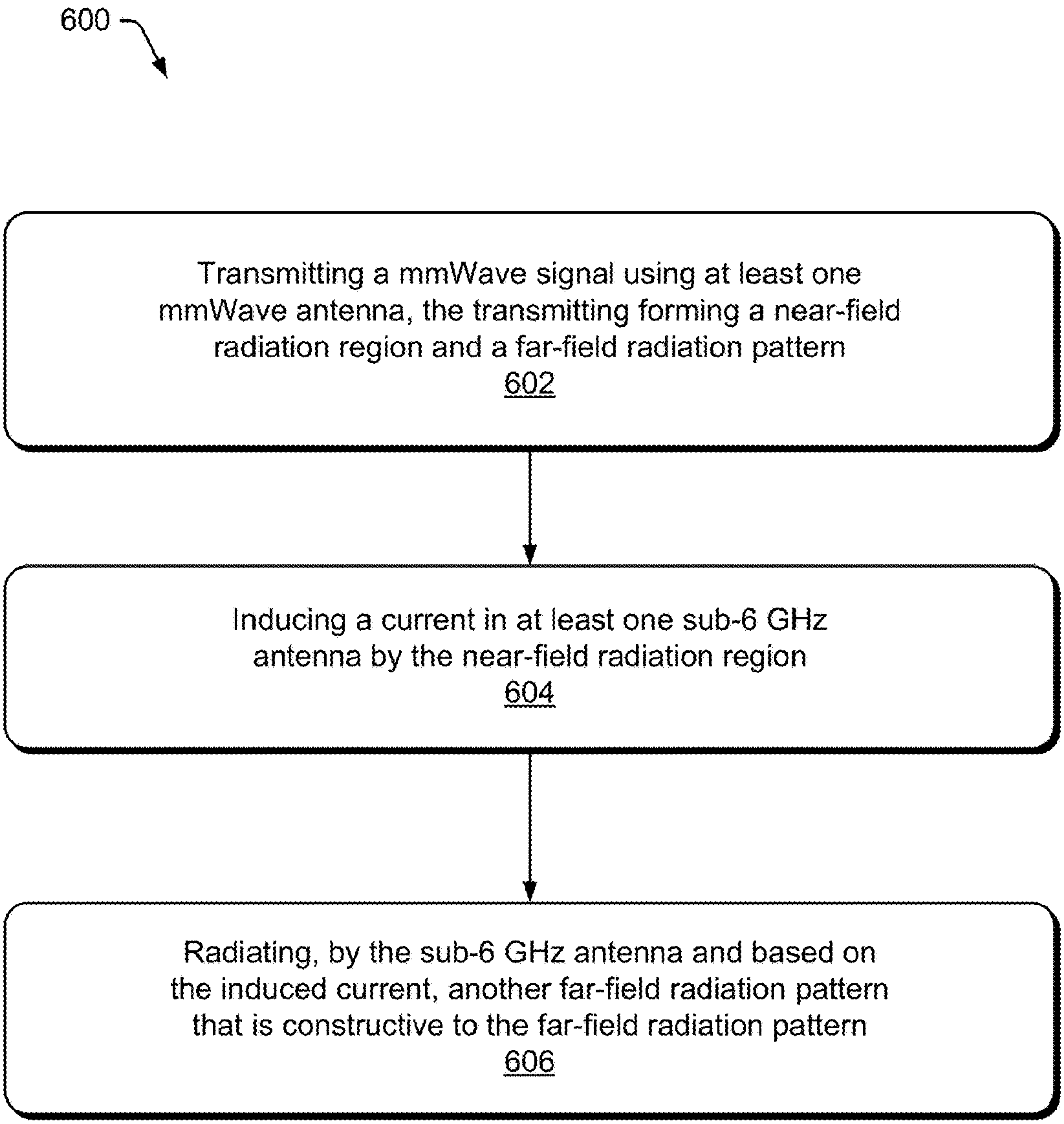
FIG. 6 illustrates an example method of using collocated mmWave and sub-6 GHz antennas.

FIG. 6 depicts an example method 600 of using collocated mmWave and sub-6 GHz antennas. The method described below is shown as a set of operations (or acts) performed but not necessarily limited to the order or combinations in which the operations are described herein. Further, any of one or more of the operations can be repeated, combined, reorganized, or linked to provide a wide array of additional and/or alternate methods. In portions of the following discussion, reference can be made to components discussed with respect to FIGS. 1-5, reference to which is made for example only. The techniques are not limited to performance by one entity or multiple entities operating on one device.

At 602, a millimeter-wave (mmWave) signal is transmitted using at least one mmWave antenna. The transmitted mmWave signal forms a near-field radiation region and a far-field radiation pattern in a mmWave frequency band. For example, the mmWave antenna 106 transmits a mmWave signal, which forms the near-field radiation region 302 and the far-field radiation pattern 304 shown in FIG. 3. The mmWave signal can include a wireless communication signal used to form the mmWave wireless link 112 or a radar signal 116 used to recognize the user 114's gestures, as shown in FIG. 1. The mmWave signal can include frequencies that are greater than or equal to 24 GHz (e.g., approximately 30 GHz or approximately 60 GHz).

At 604, a current is induced in at least one sub-6 GHz antenna by the near-field mmWave radiation. For example, the mmWave antenna 106 induces, via the near-field radiation region 302, a current 306 in the sub-6 GHz antenna 108. The sub-6 GHz antenna 108 can include one or more conductive elements (e.g., metal pieces 414-1 and 414-2 of FIG. 4) that are within the near-field radiation region 302. In some implementations, a distance between the sub-6 GHz antenna 108 and the mmWave antenna 106 is a few millimeters or less (e.g., less than one millimeter). The sub-6 GHz antenna 108 is disposed between the mmWave antenna 106 and the housing 212, as shown in FIG. 4. In some cases, the sub-6 GHz antenna 108 and the mmWave antenna 106 are disposed in the top bezel 312 area of the user device 102.

At 606, another far-field radiation pattern in the mmWave frequency band is generated by the sub-6 GHz antenna based on the induced current from the mmWave near-field radiation. The other far-field radiation pattern is constructive to the far-field radiation pattern of the mmWave antenna. For example, the sub-6 GHz antenna 108 radiates another far-field radiation pattern based on the induced current 306. The other far-field radiation pattern radiated by the sub-6 GHz antenna 108, in conjunction with the far-field radiation pattern 304, creates a combined far-field radiation pattern having the implemented angular coverage 522 and the implemented direction of maximum energy 518, as shown in FIG. 5. The implemented angular coverage 522 and/or the implemented direction of maximum energy 518 increases the mmWave coverage area of the mmWave antenna 106 relative to other implementations that do not integrate the sub-6 GHz antenna 108 within the near-field radiation region 302 of the mmWave antenna 106. In this way, the user device 102 can realize a particular amount of mmWave coverage using fewer mmWave antennas 106 while also efficiently utilizing available space to support multiple frequency bands.

Example Computing System

Figure 7:
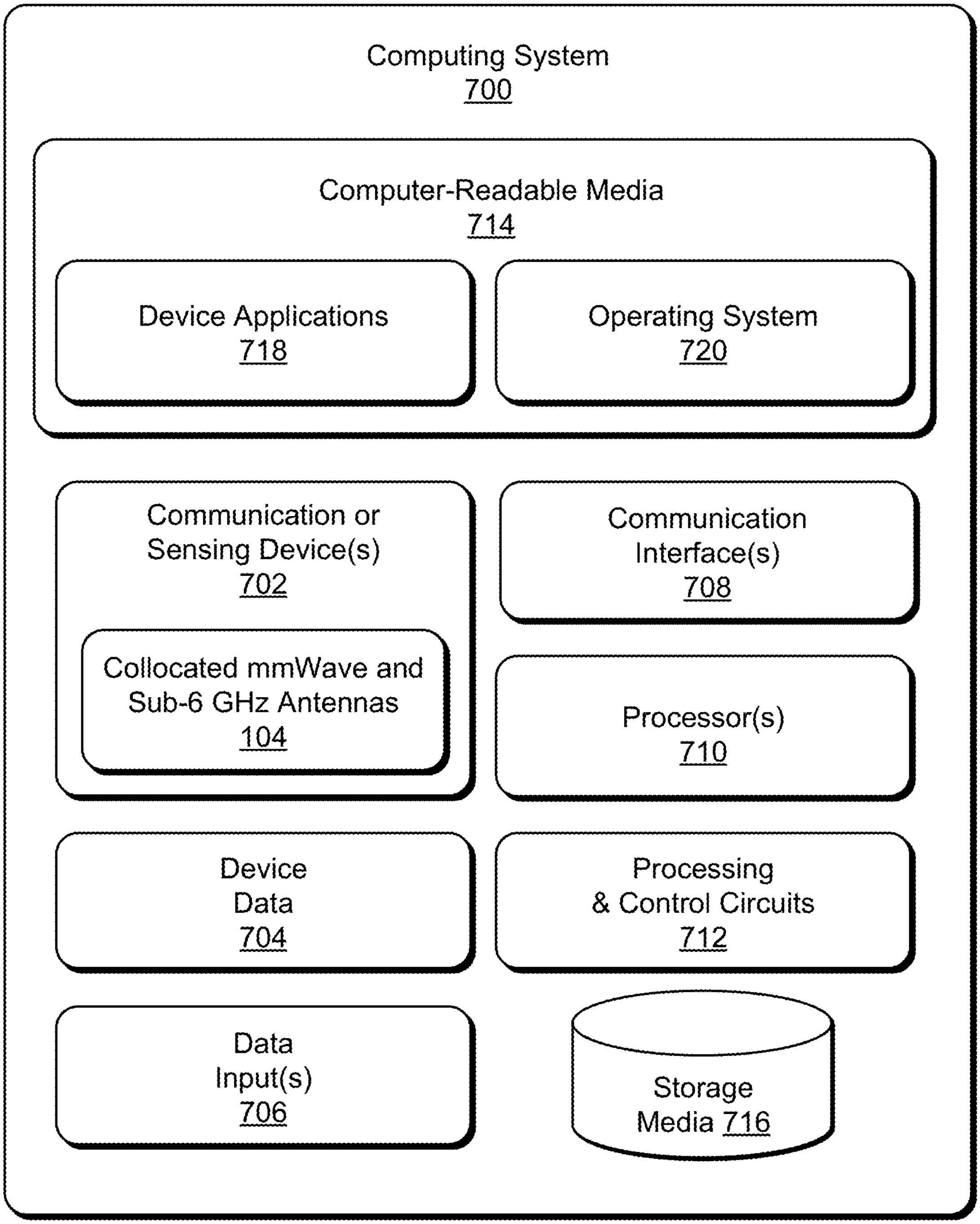
FIG. 7 illustrates an example computing system embodying, or in which techniques can be implemented that enable use of, a metal structure for steering and broadening mmWave antenna coverage.

FIG. 7 illustrates various components of an example computing system 700 that can be implemented as any type of client, server, and/or computing device as described with reference to the previous FIG. 2 for wireless communication applications.

The computing system 700 includes the collocated mmWave and sub-6 GHz antennas 104 as part of, or connected to, one or more communication or sensing devices 702 (e.g., mmWave transceiver 208 and sub-6 GHz transceiver 210) that enable wireless communication of device data 704 (e.g., received data, data that is being received, data scheduled for broadcast, or data packets of the data) or radar sensing. The device data 704 or other device content can include configuration settings of the device, media content stored on the device, and/or information associated with a user of the device. Media content stored on the computing system 700 can include any type of audio, video, and/or image data. In this case, the collocated mmWave and sub-6 GHz antennas 104 help facilitate transmission or reception of signals that carry at least a portion of the device data 704 or are used for radar sensing. The computing system 700 includes one or more data inputs 706 that receive any type of data, media content, and/or inputs. Other types of data inputs 706 include human utterances, user-selectable inputs (explicit or implicit), messages, music, television media content, recorded video content, user gestures, and any other type of audio, video, and/or image data received from any content and/or data source.

The computing system 700 also includes one or more communication interfaces 708, which can be implemented as any one or more of a serial and/or parallel interface, a wireless interface, any type of network interface, a modem, and as any other type of communication interface. The communication interfaces 708 provide a connection and/or communication links between the computing system 700 and a communication network by which other electronic, computing, and communication devices communicate data with the computing system 700.

The computing system 700 includes one or more processors 710 (e.g., any of microprocessors, controllers, and the like), which process various computer-executable instructions to control the operation of the computing system 700. Alternatively or in addition, the computing system 700 can be implemented with any one or combination of hardware, firmware, or fixed logic circuitry that is implemented in connection with processing and control circuits which are generally identified at 712. Although not shown, the computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 700 also includes a computer-readable media 714, such as one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device can be implemented as any type of magnetic or optical storage device, such as a hard disk drive, a recordable and/or rewriteable compact disc (CD), any type of a digital versatile disc (DVD), and the like. The computing system 700 can also include a mass storage media device (storage media) 716.

The computer-readable media 714 provides data storage mechanisms to store the device data 704, as well as device applications 718 and any other types of information and/or data related to operational aspects of the computing system 700. For example, an operating system 720 can be maintained as a computer application with the computer-readable media 714 and executed on the processors 710. The device applications 718 can include a device manager, such as any form of a control application, software application, signal-processing and control module, code that is native to a particular device, a hardware abstraction layer for a particular device, and so on. The device applications 718 also include any system components, engines, or managers to enable wireless communication or radar-based applications (e.g., presence detection, gesture recognition, collision avoidance, or human vital-sign detection).

EXAMPLES

Example 1: An apparatus comprising: a housing; at least one millimeter-wave antenna configured to generate a near-field radiation region in a millimeter-wave frequency band; and at least one sub-6 gigahertz antenna: configured to generate a radiation pattern in a sub-6 gigahertz frequency band; disposed between the millimeter-wave antenna and the housing; and disposed within the near-field radiation region of the millimeter-wave antenna.

Example 2: The apparatus of example 1, wherein the sub-6 gigahertz antenna and the millimeter-wave antenna are stacked such that a portion of the sub-6 gigahertz antenna overlaps a portion of the millimeter-wave antenna in an x-z plane, the x-z plane being normal to a direction of maximum energy of the millimeter-wave antenna without beamforming.

Example 3: The apparatus of example 2, wherein the sub-6 gigahertz antenna is separated from the millimeter-wave antenna in the direction of maximum energy of the millimeter-wave antenna without beamforming.

Example 4: The apparatus of any one of examples 1 to 3, wherein the sub-6 gigahertz antenna and the millimeter-wave antenna are disposed in a top bezel area of the apparatus.

Example 5: The apparatus of any one of examples 1 to 4, wherein at least one of the sub-6 gigahertz antenna or the millimeter-wave antenna comprises an array of antennas.

Example 6: The apparatus of any one of examples 1 to 5, wherein the sub-6 GHz antenna is further configured to reflect a portion of the near-field radiation region effective to cause a direction of maximum energy associated with a far-field radiation pattern of the millimeter-wave antenna to be approximately forty-five degrees.

Example 7: The apparatus of any one of examples 1 to 6, wherein the sub-6 GHz antenna is further configured to reflect the portion of the near-field radiation region effective to cause a range of angles associated with a far-field radiation pattern of the millimeter-wave antenna to be approximately one-hundred twenty degrees.

Example 8: The apparatus of any one of examples 1 to 5, wherein the millimeter-wave antenna is configured to induce a current within the sub-6 gigahertz antenna using the near-field radiation region.

Example 9: The apparatus of any of examples 1 to 8, wherein: the millimeter-wave antenna is further configured to radiate a far-field radiation pattern in the millimeter-wave frequency band; and the sub-6 GHz antenna is further configured to radiate another far-field radiation pattern in the millimeter-wave frequency band based on the current induced in the sub-6 gigahertz antenna, the other far-field radiation pattern being combinable with the far-field radiation pattern to produce a combined far-field radiation pattern.

Example 10: The apparatus of example 9, wherein the combined far-field radiation pattern comprises a broader range of angles than the far-field radiation pattern.

Example 11: The apparatus of example 9 or 10, wherein the combined far-field radiation pattern has a direction of maximum energy that is different than that of the far-field radiation pattern.

Example 12: The apparatus of any preceding example, further comprising one or more of a Bluetooth™ transceiver, a 4th-Generation transceiver, or a transceiver coupled to the sub-6 gigahertz antenna.

Example 13: The apparatus of any preceding example, further comprising a 5th-Generation transceiver coupled to the millimeter-wave antenna.

Example 14: The apparatus of any preceding example, further comprising a radar transceiver coupled to the millimeter-wave antenna.

Example 15: The apparatus of any preceding example, wherein the apparatus comprises: a smartphone; a smart speaker; a smart thermostat; a smart watch; a gaming system; or a home appliance.

Example 16: A method comprising: transmitting a millimeter-wave signal using at least one millimeter-wave antenna, the transmitting of the millimeter-wave signal forming a near-field radiation region and a far-field radiation pattern in a millimeter-wave frequency band; inducing a current in at least one sub-6 gigahertz antenna by the near-field radiation region; and radiating, by the sub-6 gigahertz antenna and based on the induced current from the near-field radiation region, another far-field radiation pattern in the millimeter-wave frequency band to obtain a combined millimeter-wave far-field radiation pattern.

Example 17: The method of example 16, wherein the other far-field radiation pattern is constructive to the far-field radiation pattern by increasing a range of angles or changing a direction of maximum energy of the combined millimeter-wave far-field radiation pattern compared to the far-field radiation pattern without the other far-field radiation pattern.

Example 18: The method of example 17, wherein the other far-field radiation pattern changes the direction of maximum energy associated with the combined millimeter-wave far-field radiation pattern by approximately forty-five degrees compared to the far-field radiation pattern without the other far-field radiation pattern.

Example 19: The method of example 17 or 18, wherein the other far-field radiation pattern changes the range of angles associated with the combined millimeter-wave far-field radiation pattern to be approximately one-hundred twenty degrees.

Example 20: An apparatus comprising: a housing; at least one millimeter-wave antenna configured to generate a near-field millimeter-wave radiation pattern; and at least one sub-6 gigahertz antenna: configured to generate a sub-6 gigahertz radiation pattern; disposed between the millimeter-wave antenna and the housing; and disposed within a region corresponding to the near-field millimeter-wave radiation pattern of the millimeter-wave antenna.

CONCLUSION

Although techniques using, and apparatuses including, collocated mmWave and sub-6 GHz antennas have been described in language specific to features and/or methods, it is to be understood that the subject of the appended claims is not necessarily limited to the specific features or methods described. Rather, the specific features and methods are disclosed as example implementations of collocated mmWave and sub-6 GHz antennas.

The invention claimed is:

1. An apparatus comprising:

a housing;

at least one millimeter-wave antenna having a surface disposed such that a normal to the surface of the at least one millimeter-wave antenna is orthogonal to an x-z plane, the at least one millimeter-wave antenna configured to:

generate a near-field millimeter-wave radiation pattern;

induce a current within at least one sub-6 GHz antenna using the near-field millimeter-wave radiation pattern; and generate a far-field millimeter-wave radiation pattern with a first direction of maximum energy orthogonal to the x-z plane; and the at least one sub-6 gigahertz (GHz) antenna:

configured to generate a sub-6 GHz radiation pattern;

further configured to radiate another far-field millimeter-wave radiation pattern based on the current induced in the sub-6 GHz antenna, the other far-field millimeter-wave radiation pattern being constructive to the far-field millimeter-wave radiation pattern from the millimeter-wave antenna and combinable with the far-field millimeter-wave radiation pattern to produce a combined far-field millimeter-wave radiation pattern;

disposed between the millimeter-wave antenna and the housing;

disposed within a region corresponding to the near-field millimeter-wave radiation pattern of the millimeter-wave antenna;

having a surface disposed such that a normal to the surface of the sub-6 GHz antenna is orthogonal to the x-z plane;

disposed such that:

a first portion of the sub-6 GHz antenna is on a first side of the mmWave antenna along a first direction of an x axis of the x-z plane, the first portion having a first length along the x axis;

a second portion is along a second side of the mmWave antenna along an opposite direction to the first direction along the x axis, the second portion having a second length along the x axis, the first portion length greater than the second length; and a difference between the first portion and the second portion is configured to produce a second direction of maximum energy of the combined far-field millimeter-wave radiation pattern, the second direction of maximum energy at an angle to the first direction of maximum energy.

2. The apparatus of claim 1, wherein the at least one sub-6 GHz antenna is separated from the at least one millimeter-wave antenna in the direction of maximum energy of the at least one millimeter-wave antenna without beamforming.

3. The apparatus of claim 1, wherein the at least one sub-6 GHz antenna and the at least one millimeter-wave antenna are disposed in a top bezel area of the apparatus.

4. The apparatus of claim 1, wherein at least one of the at least one sub-6 GHz antenna or the at least one millimeter-wave antenna comprises an array of antennas.

5. The apparatus of claim 1, wherein the angle is approximately forty-five degrees.

6. The apparatus of claim 1, wherein the angle is approximately one-hundred twenty degrees.

7. The apparatus of claim 1, further comprising one or more of a Bluetooth™ transceiver, a 4th-Generation transceiver, or a Wi-Fi™ transceiver coupled to the one or more sub-6 GHz antenna.

8. The apparatus of claim 1, further comprising a 5th-Generation transceiver coupled to the one or more millimeter-wave antenna.

9. The apparatus of claim 1, further comprising a radar transceiver coupled to the one or more millimeter-wave antenna.

10. The apparatus of any preceding claim, wherein the apparatus comprises at least one of:
- a smartphone;
- a smart speaker;
- a smart thermostat;
- a smart watch;
- a gaming system; or
- a home appliance.

11. A method comprising transmitting a millimeter-wave signal using at least one millimeter-wave antenna, the transmitting of the millimeter-wave signal forming a near-field radiation pattern and a far-field radiation pattern in a millimeter-wave frequency band, with a first direction of maximum energy orthogonal to the x-z plane, the at least one millimeter-wave antenna:

having a surface disposed such that a normal to the surface of the at least one millimeter-wave antenna is orthogonal to an x-z plane; and inducing a current in at least one sub-6 GHz antenna by the near-field radiation pattern, the at least one sub-6 GHz antenna:

radiating, based on the induced current from the near-field radiation pattern, another far-field radiation pattern in the millimeter-wave frequency band that is constructive to the far-field radiation pattern radiated by the millimeter-wave antenna and combinable with the far-field millimeter-wave radiation pattern to produce a combined far-field millimeter-wave radiation pattern;

having a surface disposed such that a normal to the surface of the sub-6 GHz antenna is orthogonal to the x-z plane; and disposed such that:

a first portion of the sub-6 GHz antenna is on a first side of the mmWave antenna along a first direction of an x axis of the x-z plane, the first portion having a first length along the x axis;

a second portion is along a second side of the mmWave antenna along an opposite direction to the first direction along the x axis, the second portion having a second length along the x axis, the first length greater than the second length; and a difference between the first portion and the second portion is configured to produce a second direction of maximum energy of the combined far-field millimeter-wave radiation pattern, the second direction of maximum energy at an angle to the first direction of maximum energy.

12. The method of claim 11, wherein the angle is approximately forty-five degrees.

13. The method of claim 11, wherein the angle is approximately one-hundred-twenty degrees.

14. The method of claim 11, wherein the at least one sub-6 GHz antenna and the at least one millimeter-wave antenna are disposed in a top bezel area of a same apparatus.

15. The method of claim 11, wherein the at least one sub-6 GHz antenna is separated from the at least one millimeter-wave antenna in the direction of maximum energy of the at least one millimeter-wave antenna without beamforming.

16. The method of claim 11, wherein at least one of the at least one sub-6 GHz antenna or the at least one millimeter-wave antenna comprises an array of antennas.

17. The method of claim 11, wherein one or more of a Bluetooth™ transceiver, a 4th-Generation transceiver, or a Wi-Fi™ transceiver are coupled to the one or more sub-6 GHz antenna.

18. The method of claim 11, wherein a 5th-Generation transceiver is coupled to the one or more millimeter-wave antenna.

19. The method of claim 11, wherein the far-field millimeter-wave radiation pattern has a first angular spread about the first direction of maximum energy and the combined far-field millimeter-wave radiation pattern has a second angular spread about the second direction of maximum energy, the first angular spread less than the second angular spread.

20. The apparatus of claim 1, wherein the far-field millimeter-wave radiation pattern has a first angular spread about the first direction of maximum energy and the combined far-field millimeter-wave radiation pattern has a second angular spread about the second direction of maximum energy, the first angular spread less than the second angular spread.

* * * * *